United States Patent
Schepler et al.

[11] 3,708,064
[45] Jan. 2, 1973

[54] METHOD AND APPARATUS FOR INSPECTING DIELECTRIC MEMBERS

[75] Inventors: Kent L. Schepler; Larry J. Schmersal, both of Toledo, Ohio

[73] Assignee: Owens-Illinois, Inc.

[22] Filed: March 16, 1971

[21] Appl. No.: 124,680

[52] U.S. Cl............209/73, 209/111.5, 324/58.5 A, 250/83.3 R
[51] Int. Cl..............................................B07c 5/08
[58] Field of Search .324/58.5; 209/111.7, 73, 111.6, 209/111.5; 250/83.3

[56] References Cited

UNITED STATES PATENTS

| | | | |
|---|---|---|---|
| 3,594,579 | 7/1971 | Garett | 209/111.5 X |
| 2,833,937 | 5/1958 | Cox | 209/111.6 X |
| 3,390,769 | 7/1968 | Tatham et al. | 209/111.5 |
| 3,366,236 | 1/1968 | Breazeale | 209/111.5 |
| 3,393,799 | 7/1968 | Schmersal | 209/73 |

Primary Examiner—Allen N. Knowles
Assistant Examiner—Gene A. Church
Attorney—D. T. Innis and E. J. Holler

[57] ABSTRACT

In a preferred embodiment of the invention a method and apparatus for inspecting glass containers is described. A high frequency signal is transmitted at an inspection station. The transmitted high frequency signal is received and a detection output is provided which is related in amplitude to the amplitude of the received signal. The steady state detection output is sensed when no container is at the inspection station. A wall of a container is moved past an inspection position to vary the amplitude of the received signal and thus the detection output in accordance with the thickness of the wall at the inspection position. The varying detection output is compared with the steady state detection output to derive a thickness signal proportional to the thickness of the moving wall. The thickness signal is compared with a reject reference signal to detect a non-acceptable container. The magnitude of the reject reference signal is controlled by the steady state detection output to automatically compensate for long term component and ambient variations.

16 Claims, 3 Drawing Figures

INVENTORS
KENT L. SCHEPLER
LARRY J. SCHMERSAL

ATTORNEYS

METHOD AND APPARATUS FOR INSPECTING DIELECTRIC MEMBERS

BACKGROUND OF THE INVENTION

The present invention is particularly useful in automatic inspecting apparatus capable of measuring the thickness of wall portions of glass containers. A radio frequency field is established in close proximity to a limited surface area of the container and the change in the field strength due to the interposition of a dielectric material in the field is measured. This measurement is preferably made by positioning a probe in the same plane as the field and centrally of the established field so that the field will pass into the wall of the container or dielectric member being gauged. The induced voltage at the probe will be an indication of the change in field strength due to the thickness of the dielectric. The voltage output from the probe has been found to be linear throughout a substantial portion of the measuring range and in particular for the range of glass containers whose thickness may vary between 0.010 inch and 0.070 inch.

It is desirable to segregate glass containers having wall thicknesses less than a predetermined dimension since containers having thin areas in the wall portions thereof frequently become cracked or break during the handling of the containers through the filling and capping operations.

There are certain limits with respect to the thickness of glass forming the walls of articles which are acceptable. In the case of blown glass containers, it has been found that when a container has a thick side wall there will usually be a correspondingly thin walled portion formed. If the deviation between the thickest and thinnest portion of the wall of the container is beyond tolerances, the blown glass container is not acceptable since it may not withstand pressures of the contents or will not have sufficient strength to withstand handling through filling, packaging and distribution processes.

Advances have been made in automatic inspecting methods and apparatus in which a high frequency field is utilized. Examples of these advances are disclosed in U.S. Pat. No. 3,379,306, issued Apr. 23, 1968, and in U. S. Pat. No. 3,393,799, issued July 23, 1968. While the advances described in the above-referenced patents have been most satisfactory it has been discovered that there is a need for automatically compensating for changes in the high frequency signal level caused by amplifier gain drift, cable flexure, dirt accumulation on probes, and the like.

In U.S. Pat. No. 3,379,306 a reference probe was utilized which was positioned to receive the transmitted high frequency signal without variation of the signal by the container being inspected. The reference probe was connected to provide a magnitude calibration and establish a reject reference signal to which the thickness measuring signal could be compared. In U.S. Pat. No. 3,393,799, a reference signal was derived directly from the high frequency signal being transmitted to provide a reject level to which the measured signal could be compared. While both of the above methods perform satisfactorily they do not automatically compensate for changes in the high frequency signal level.

Accordingly, it is an object of this invention to provide an improved method and apparatus for inspecting dielectric members.

It is a further object of this invention to provide improved method and apparatus for inspecting dielectric members which automatically compensates for component and ambient variations over a period of time.

It is a still further object of this invention to provide improved method and apparatus which will provide a signal whose magnitude is proportional to glass wall thickness, zero volts representing a glass thickness of zero.

It is a still further object of this invention to provide improved method and apparatus which will automatically establish a reference signal comparable to a glass thickness of zero, even though there may be component aging and temperature variations over a period of time.

It is a still further object of this invention to determine glass thickness by the change in the amplitude alone of a high frequency signal.

SUMMARY OF THE INVENTION

The above objects are carried out in a preferred embodiment of the invention which features apparatus for measuring the wall thickness of glass containers. Means are provided for moving a succession of containers into an inspection station. Means at the inspection station rotate the containers about their vertical axes. At least one inspection head is provided at the inspection station and includes means for establishing an electromagnetic field extending through a wall of a container and probe means for sensing the electromagnetic field. An amplifier connected to the probe provides a detection output which varies in amplitude in response to a variance in the electromagnetic field sensed by the probe. Means are provided for receiving the detection output before a container is moved into the inspection station to provide a reference output. After a container is moved into the inspection station means receiving the detection output compares that detection output to the reference output to derive a signal proportional to the thickness of the walls or the container in the electromagnetic field. Means are also provided which are responsive to the reference output for establishing a reject level signal. A comparing means compares the thickness signal and the reject level signal to indicate acceptable and not acceptable containers.

Other objects, advantages and features of this invention will become apparent when the following description is taken in conjunction with the accompanying drawings, in which.

DESCRIPTION OF THE PREFERRED EMBODIMENT

Figure 1:
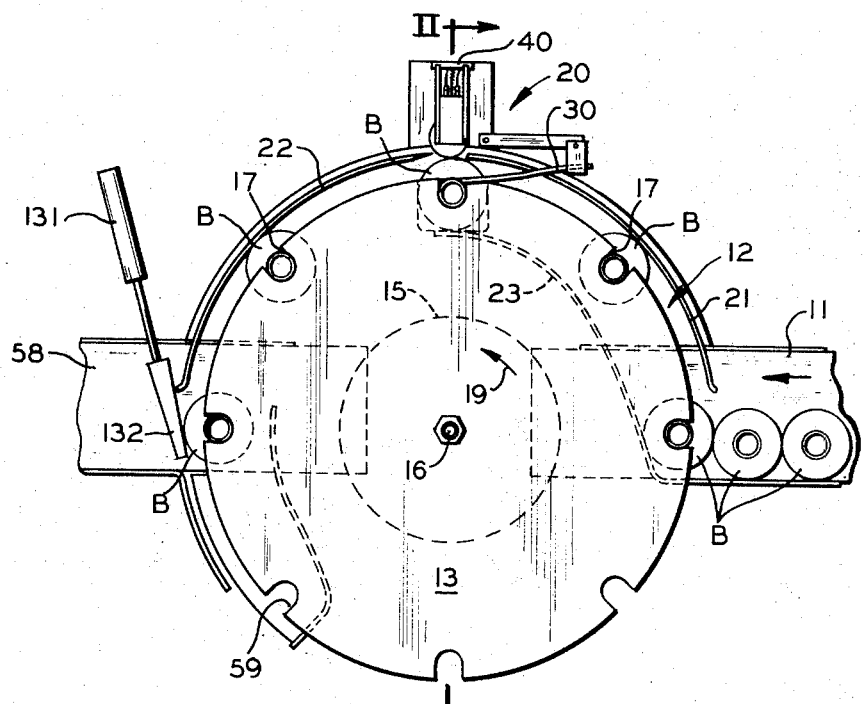
FIG. 1 is a top plan view of apparatus embodying the teachings of this invention.
Figure 2:
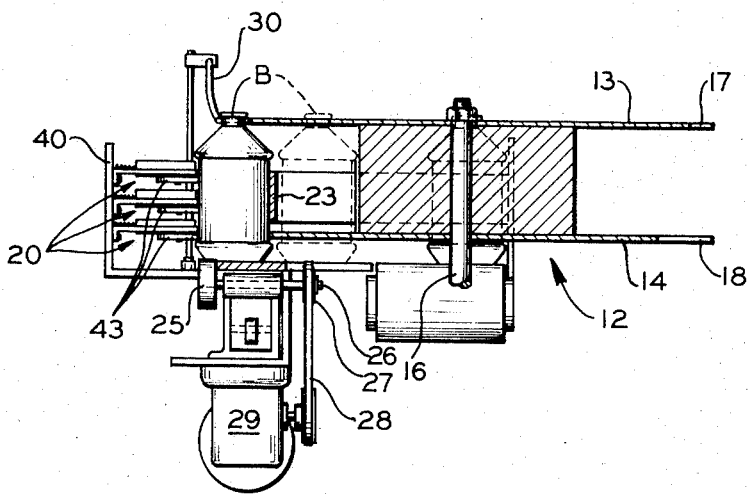
FIG. 2 is a cross-sectional view of the apparatus illustrated in FIG. 1 taken along line II—II in FIG. 1.

As illustrated in FIGS. 1 and 2 the mechanism feeds bottles individually from a succession of bottles positioned on a conveyor into a rotating carrier which carries the bottles to an inspection position at which the bottles are rotated. The details of this mechanism are described in the above-referenced U. S. Pat. No. 3,379,306.

The carrier will position a container in front of an inspection device. While the container is so positioned, it is rotated about its vertical axis and the inspection heads are held in precise, close proximity to the side walls of the bottles at selected vertical locations thereof. As many probe or inspection devices as desired may be mounted to gauge the thickness of a plurality of circumferential areas of the container wall.

Variations in the wall thickness of the container being inspected will provide a signal which is processed by the system to operate a mechanism to automatically reject any bottle which is found to be outside the dimensional tolerances for acceptable containers. In FIGS. 1 and 2 the apparatus of the invention is suitably supported in the position illustrated adjacent an incoming flight conveyor 11 which carries the bottles B to be inspected. The bottles are advantageously spaced along the length of the conveyor 11 to arrive in timed sequence with respect to the pockets formed in the carrier 12.

The carrier 12 takes the form of a pair of parallel, spaced apart discs 13 and 14. The disc 13 and 14 are connected together and spaced apart by a block 15 to form a unitary structure generally designated at 12. A shaft 16 is fixed centrally of the structure 12 and is driven by a mechanism (not shown) which provides an indexing motion into and out of the inspection station.

The upper disc 13 is provided with slots 17 within which the necks of the bottles B will fit, while the lower disc 14 is provided with slots 18 within which the lower side wall portion of the bottle will fit. Upon indexing movement of the carrier 12 in the direction of the arrow 19 shown thereon, the bottles B will be carried in succession from the incoming conveyor 11 in to the inspection station opposite the inspection heads 20.

The bottles are guided in their arcuate travel from the incoming conveyor 11 by a rail 21. A rail 22 is provided on the exit side of the inspection station to hold the bottles within the pockets formed by the slots 17 and 18. The rails 21 and 22 are of sufficient width to engage the sides of the bottles in a manner to prevent them from tipping during their arcuate movement from the incoming conveyor 11 to and through the inspection station.

The incoming rail 21 is provided with a facing formed of a material which frictionally engages the bottles. As the bottles are moved from the incoming conveyor 11 into the inspection position, they will be rotated about their axis in a clockwise direction determined by their frictional engagement with the facing material on the rail 21. In this manner the starting friction involved in rotating the bottles at the inspection station is overcome since, when the bottles arrive at the inspection station, they will already be rotating clockwise and engagement with the roller 25 will impart additional clockwise rotation to the bottles at relatively high speeds.

As the bottles are moving into the inspection position, they are forced outwardly of the slots 17 and 18 by engagement with a spring arm 23 which bears against the side wall of the bottle midway of the height of the bottle. As the bottle comes into the position shown in solid lines in FIG. 2, the lower heel portion of the bottle will engage the driving roller 25. The roller 25 is carried by a shaft 26 which in turn carries a drive pulley 27. The pulley 27 is driven by a belt 28 from a motor 29. The motor 29 will drive the roller 25 continuously and when the bottle arrives in engagement with roller 25, the bottle will be rotated about its vertical axis. To prevent the bottle from bouncing on the roller 25 or becoming temporarily disengaged therefrom, the bottle is held down by a spring arm 30. If it is necessary to have additional hold down means, a roller which engages the top of the bottle may be provided in the manner disclosed in the above-referenced U.S. Pat. No. 3,379,306.

With the bottle to be inspected located in the inspection station, a plurality of inspection heads 20 vertically spaced apart with respect to each other will be held against the side wall of the bottle. Specific vertical spacing and location of the heads is a manner of design preference and experience when inspecting bottles. Each particular design usually has problem areas in that during the manufacturing of the bottles there is a tendency to form containers with thin wall sections at specific, known areas. The heads will therefore usually be positioned opposite those portions of the walls of the container which through experience have been found most likely to be areas where thin sections may appear.

The details of the inspection heads 20 which are suitable for use in this invention are disclosed and described in the above-referenced U. S. Pat. No. 3,393,799. A mounting plate 40 carries the vertically spaced apart heads 20 in a position at the inspection station adjacent the outside surface of the container. Each inspection head carries a stand-off wheel 43. The periphery of the wheel 43 extends beyond the front face of the inspection head probe and thus defines a stand-off distance of the inspection head with respect to a bottle B when the bottle is in engaging position.

Figure 3:
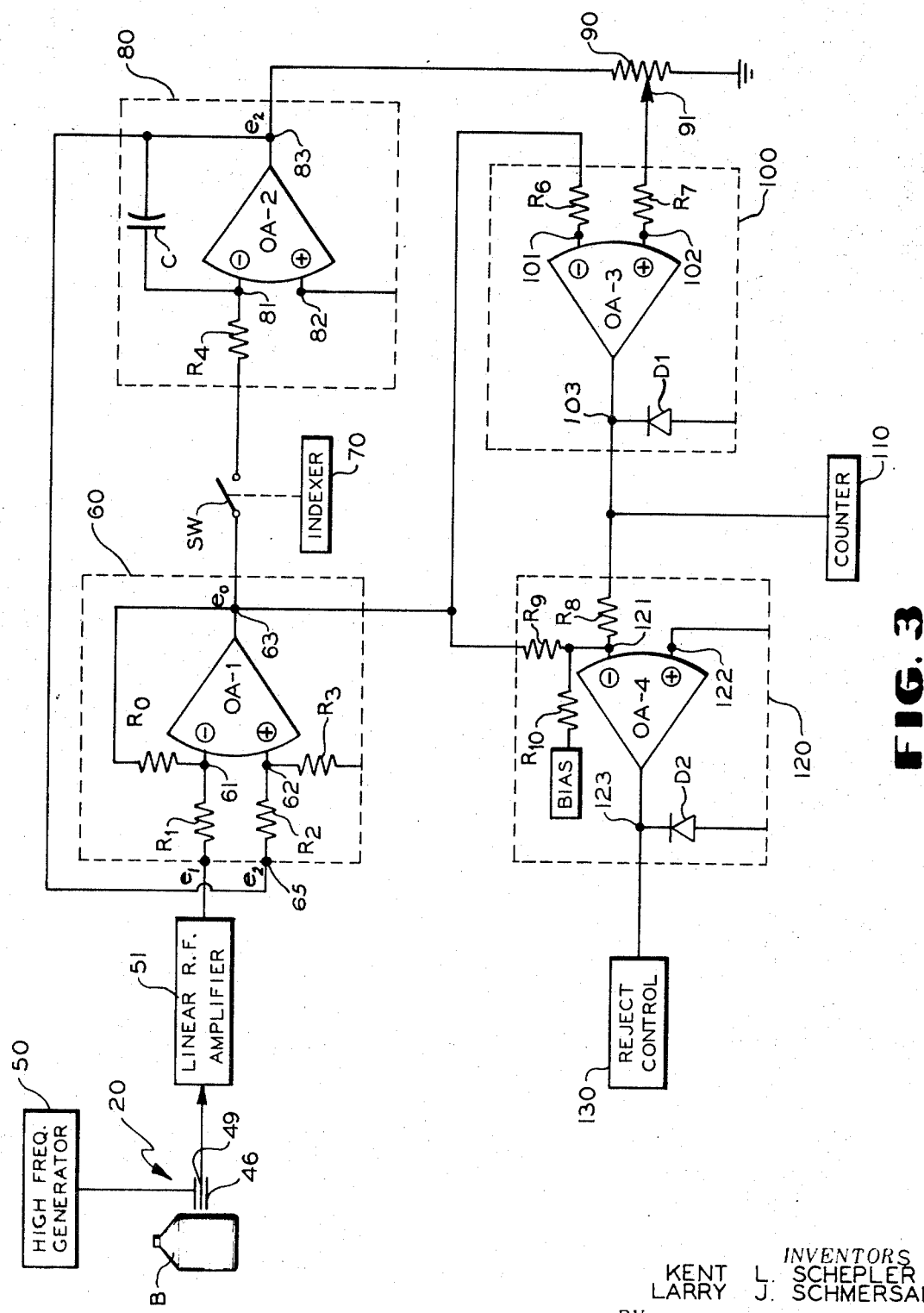
FIG. 3 is a schematic-block diagram layout of the electronic system embodying the teachings of this invention.

Referring now to FIG. 3 the electronic measuring portion of the system will be described. A high frequency signal is provided by the generator 50 to a conductive sleeve 46 in a head 20 which forms a radio frequency antenna. The high frequency signal may be in the order of 13,560,000 cycles per second to establish a radio frequency field which extends outwardly from the front face of the antenna 46 into the region of the side wall of the container B being engaged. This field will have a particular strength and shape depending upon the dielectric of the material positioned in front of the head 20. When a container is moved into the inspection station the field will be distorted to a certain extent, the field strength will be changed, and the amplitude and phase of the high frequency signal induced in the probe 49 will be changed depending upon the thickness of the dielectric material in front of the antenna 46. Thus, the magnitude of the voltage induced in the probe 49 which is positioned coaxially within the antenna 46 in the head 20 varies substantially linearly with the variation in the thickness of the glass being gauged.

It should be understood that each of the plural inspection heads may be identical to that illustrated diagrammatically in FIG. 3 and that as many of these heads are as desirable may be provided to gauge the thickness characteristics of a test object. While the preferred embodiment of this invention is illustrated by apparatus directed principally to measuring the wall thickness of glass containers, it should be obvious that the present apparatus is capable of being utilized to gauge the thickness of other shapes of dielectric materials, such as sheet glass, tubing, etc. Moreover, while the electronic system is specifically directed to detecting thin areas of a glass container wall which are not of an acceptable thickness, it should be understood that the invention may be modified to also detect alarm when a wall thickness above a specified dimension is detected. Not only may it be desirable to detect an oversize wall thickness, it will be remembered that it was noted hereinbefore that for an oversize wall thickness there is usually an undersize wall thickness in another portion of the bottle. Thus, while a too thin portion may not be detected the bottle having an excessive wall thickness may be set to one side for further inspection or rechecked to insure that no corresponding thin wall portions are in the bottle.

A linear radio frequency amplifier 51 is connected to receive the output from the probe 49 and provides a direct current voltage output that is related or proportional in amplitude to the amplitude of the high frequency input received from the probe 49.

A summer circuit 60 includes an operational amplifier OA-1 having a first input terminal 61, a second input terminal 62, and an output terminal 63. The operational amplifier OA-1 is a known circuit which provides an amplified output which depends only upon the circuit constants and is substantially independent of the gain of the amplifier, and hence of supply voltages, aging of tubes, tube replacements, other component variations, etc. This result arises from the fact that when the amplification is large, any change in amplification alters the equivilant action of the circuit constants just sufficiently to offset the effect of the change in amplification. These amplifiers are termed operational amplifiers because they may be utilized in carrying out a mathematical operation.

The output of the summer circuit 60 is connected through a switch SW to the input of an integrating circuit 80. The switching means SW is responsive to the position of the mechanism indexing the unitary structure 12. That is, in this embodiment a mechanical tie between the indexer 70 and the switching means SW is operable to open the switching means SW when the pockets in the structure 12 are opposite the inspection heads 20. The switching means SW is closed by the indexer 70 when there are no pockets opposite the inspecting heads 20. Therefore, if containers are successively being fed to the indexing carrier the switching means SW is open when a container is being inspected at the inspection station and is closed when there is no container at the inspection station.

The integrating circuit 80 includes an operational amplifier OA-2 having a first input terminal 81, a second input terminal 82, and an output terminal 83.

The summer circuit 60, as its name implies, is a circuit whose output voltage is proportional to a weighted sum of its input voltages. The weighting factors can be either positive or negative constants. Thus the summer can also be made to subtract voltages.

The integrator circuit 80 is a circuit in which output voltage changes at a rate determined by the input voltage. To be more specific, when the input voltage to the integrator is positive, the output voltage continuously decreases at a rate determined by the input voltage. The more positive the input voltage is, the faster the output voltage will fall. When the input voltage to the integrator circuit 80 is zero, the output voltage remains fixed and will not change as long as the input voltage stays at zero. When the input voltage to the integrator is negative, the output voltage will increase at a rate determined by the input voltage. The more negative the input voltage is, the faster the output voltage will rise.

In the design of the summer circuit 60 and the integrator circuit 80 a circuit constant is derived for the input terminals 61, 62 and 81 by the arrangement of and the values of the components connected thereto. To clarify operation of the various circuits discussed herein the power supply connections for the operational amplifiers have been omitted since their connection will be understood by one skilled in the art. Connections to the chassis ground are noted by termination of electrical leads at the dotted line enclosing each circuit.

With respect to terminal 61 a feedback resistor $R_0$ is connected between the output terminal 63 and the terminal 61, and an input resistor $R_1$ is connected between the amplifier 51 and the terminal 61. Thus, a constant $K_1$ for input terminal 61 is equal to $$[-(R_0/R_1)].$$

With respect to terminal 62 a resistor $R_2$ is connected between output terminal 83 of the integrator 80 and the terminal 62, and a resistor $R_3$ is connected between the terminal 62 and the chassis ground. It can be seen that a constant $K_2$ for the terminal 62 then will equal $$[R_3/(R_2+R_3)] \cdot [1+(R_0/R_1)].$$

With respect to the input terminal 81 of the integrating circuit 80 a capacitor C has been connected between the output terminal 83 and the input terminal 81, and a resistor $R_4$ has been connected between the input terminal 81 and the switching means SW. Thus the constant $K_0$ for terminal 81 is equal to $$[-(1/R_4C)].$$

To understand the operation and cooperation between the summer circuit 60 and the integrator circuit 80, it will be necessary to distinguish the time that the index switch SW is open from the time that it is closed. To facilitate this a superscript * on a voltage symbol will indicate the value of that voltage during the time the switch SW is closed. For example, when referring to the voltage $e_1$ at terminal 64 while the switch SW is closed the symbol $e_1^*$ will be used, reserving the symbol $e_1$ for the time when the switch SW is open.

In the system formed by the summer 60 and the integrator 80 the product of the constants $K_0$ and $K_2$ is made negative, thereby forming a first order automatic control system when the switch SW is closed. As noted hereinbefore the output of the integrator 80 remains fixed only when its input voltage is zero. Thus, when the output voltage $e_0^*$ from terminal 63 is made positive, the output voltage $e_2^*$ at terminal 83 will fall. When the voltage $e_0^*$ is negative, the output voltage $e_2^*$ at terminal 83 will rise. Since the product of the constants $K_0$ and $K_2$ is made negative, this rise or fall in the voltage $e_2^*$ will be such that $K_1e_1^* + K_2e_2^*$ will tend to go to zero.

Since the value $K_1e_1^* + K_2e_2^*$ is the sum of the inputs to the summer 60, this value is equal to the output voltage $e_0^*$ at terminal 63. If the voltage $e_0^*$ is driven to zero, the output voltage $e_2^*$ at terminal 83 of the integrator 80 will remain fixed, and thus the output voltage $e_0^*$ at terminal 63 of the summer 60 will remain zero. That is, the system is satisfied and will not change unless the input voltage $e_1^*$ to the terminal 64 should change.

Thus when the switch SW is closed, which occurs only when there is no glass in front of or in proximity of the probe 49, the output voltage $e_0^*$ equaling the sum of $K_1e_1^* + K_2e_2^*$ is forced to zero at a rate governed by the product of the constants $K_0$ and $K_2$. When the switching means SW is opened by the indexer 70 and glass is then placed in front of the probe 49, the voltage $e_2$ at the terminal 83 will remain fixed at its immediately preceding value $e_2^*$, since the input to the integrator circuit 80 is zero with the switch SW open. The input voltage $e_1$ at the terminal 64 will change in amplitude according to the thickness of glass in front of the probe 49. This causes the magnitude of the output voltage $e_0$ of the summer 60 to rise to some non-zero voltage which is related to the thickness of the glass in front of the probe 49 in a substantially monotonic fashion. That is, when the value of $e_0$ is equal to zero, there is a corresponding glass thickness of zero.

The voltage $e_0$ at terminal 63 then represents a thickness signal to be compared with a reject level voltage to determine whether the thickness is acceptable or not. e.g.

By scanning the system when there is no glass in front of the probe 49 an article-absent output voltage $e_2^*$ is obtained which is a reference voltage indicating a glass thickness of zero. This reference voltage $e_2^*$ includes all of the changes that may have occurred in the components in the system or in the ambients that may affect the level of the voltages produced by the system, e.g. ambient temperature, accumulation of dirt on the probes or stand-off rollers, and the like. When the system then processes a signal received when glass is present in front of the probe 49, the automatically compensated voltage $e_2$ may be used as a reference to be compared with the input voltage $e_1$ to enable the summer 60 to provide a thickness voltage $e_0$ at terminal 63 which is a true measure of the thickness of the glass in front of the probe. The voltage $e_2$ combines with voltage $e_1$ to attempt to provide a null output of the summer when no glass is in the vicinity of the probe.

The automatically compensated reference voltage $e_2$ at terminal 83 is also utilized to provide or establish an automatically compensated reject reference voltage. A potentiometer 90 having a movable tap 91 is connected to the output voltage at terminal 83 of the integrator 80. Movement of the tap 91 enables selection of a reject level which corresponds to a minimum glass thickness which is acceptable, for example 0.040 inch. Since the voltage $e_2$ supplied to the potentiometer 90 is automatically compensated, the reject reference voltage derived from the tap at 91 will also be automatically compensated.

Referring again to FIG. 3 there is shown means for comparing the output from the summer circuit 60 with a reject reference signal to provide a reject signal when the thickness of the article is below a minimum acceptable thickness set by the magnitude of the reject reference signal.

The comparing means comprises a first comparator circuit 100 which includes an operational amplifier OA-3 with an input terminal 101, an input terminal 102 and an output terminal 103. A resistor $R_6$ connects the input terminal 101 to the thickness signal supplied by the summer circuit 60. A resistor $R_7$ connects the input terminal 102 to the adjustable tap of the potentiometer 90 and thus to the reject reference signal. A diode D1 is connected between the output terminal 103 and chassis ground. The diode D1 across the output of the operational amplifier OA-3 restricts the output of the comparator circuit to have a voltage between the positive supply voltage (saturation) and zero. Because of the very high gain nature of the amplifier OA-3, it takes only a slight net positive input to force the output to the positive saturation point or a slight negative input to force the output of the comparator circuit 100 to zero.

The comparing means also comprises a second comparator circuit 120 which includes an operational amplifier OA-4 having an input terminal 121, an input terminal 122, and an output terminal 123. The input terminal 121 is connected through a resistor $R_9$ to receive the thickness signal from the summer circuit 60. The input terminal 121 is also connected to the output of the comparator circuit 100 through a resistor $R_8$. The input terminal 121 may be connected to a bias source through resistor $R_{10}$. The input 122 is connected to chassis ground. The diode D2 connects the output terminal 123 to chassis ground to restrict the output of comparator circuit 120 to a voltage between the positive power supply voltage and zero. Again, because of the very high gain nature of the amplifier OA-4, it takes only a slight net positive input to force the output to the positive saturation point and only a slight negative input to force the output to zero.

It is desirable to count the total number of containers that have been inspected. There may be intervals while the inspection apparatus of this invention is being operated continuously in which absence of are no containers available for inspection. The output of a simple comparison between the thickness signal and the reject reference signal may not then be used to indicate both a container inspection operation and to provide a reject signal to reject a faulty container. This is true since the absence of a container at an inspection station, and a container having a wall that is too thin, both appear as a rejectable container at the output of the first comparator circuit 100. The comparator circuit 120 is utilized to inhibit the application of a thin wall signal from the comparator 100 to the reject control 130.

The first comparator circuit 100 provides a positive output if the thickness signal from the summer circuit 60 is above the reject level signal. If the thickness signal is lesser in magnitude than the reject level signal then the output of the comparator 100 is zero. Since it would be a rare occasion that the container being inspected would not have any areas above the minimum thickness, keeping in mind the tendency of containers to have a corresponding thick wall segment for every thin wall segment, the output of the first comparator circuit 100 is used to trigger a total-ware-inspected counter 110.

As noted hereinbefore, the absence of a container appears as a thin walled container at the output of the first comparator circuit 100. The second comparator circuit 120 then removes the absent ware information from the output from the first comparator circuit 100. In order for the second comparator circuit 120 to have a non-zero or positive output indicating a reject, the thickness signal from the summer 60 is monitored via the resistor $R_0$ and must exceed some minimum value established by the bias to indicate the presence of ware. Further, the output of the first comparator circuit 100 must be zero. The second comparator circuit 120 will then provide a positive reject signal at output terminal 123 to operate the reject control 130.

Referring again to FIG. 1 a reject mechanism 131 is mounted adjacent the indexing structure 12 and may take the form of a solenoid operated fluid motor having a reciprocable output member 132. With the member 132 in the position shown, the bottles arriving on the outgoing conveyor 58 will be prevented from moving out of the pockets formed in the carrier 12. On the next indexing cycle the bottle so prevented from movement on conveyor 58 will be indexed to the position shown by the empty pocket 59 where the bottle will be discharged and rejected from the machine. In the event the bottle being gauged or inspected is of an acceptable wall thickness, the reject control 130 will cause the retraction of the member 132 permitting the bottle to move on the conveyor 58 out of the pockets and to the subsequent packing area.

There has thus been described and disclosed herein a method and apparatus for measuring the thickness of an article formed of dielectric material. An inspection station is provided which includes means for establishing a high frequency field at the station which will extend through at least a portion of an article present at the station. Articles are indexed into and out of the inspection station. The high frequency field established at the station is detected and an output is provided which is related in amplitude to the amplitude of the high frequency detected. Between inspection operations a means is provided which is responsive to the position of the indexing means for receiving the detection output and providing an article-absent signal output which is related in amplitude to the received detection output. The detection output when an article is at the station is then compared with an article-absent signal output to derive a thickness signal which is proportional to the thickness of that portion of the article through which the high frequency field extends. A reject reference signal is also derived from the article-absent signal output which is proportional to an acceptable thickness. The thickness signal is then compared with the reject reference signal to determine the acceptability of an article being inspected.

In conclusion, it is pointed out that while the illustrated example constitutes a practical embodiment of our invention, we do not limit ourselves to the exact details shown since modification of these details may be made without departing from the spirit and scope of this invention.

We claim:

1. A method for inspecting articles, comprising
   a. providing a radiation field signal at an inspection station,
   b. detecting the radiation signal at the inspection station and providing a detection output related in amplitude to the amplitude of the detected signal,
   c. sensing the detection output when no article is at the inspection station and providing an article-absent signal which varies in amplitude in response to a variance in amplitude of the detection output, interrupting the responsiveness of said article-absent signal to said detection output when an article is at the inspection station and maintaining the article-absent signal fixed at the amplitude last provided in response to the amplitude of the detection output during the inspection of an article,
   d. relatively moving an article with respect to said inspection station and through said radiation field signal to vary the amplitude of the detected signal and thus the detection output, and
   e. comparing the varying detection output with the article-absent signal to derive a measurement signal proportional to a characteristic of the article in said field.

2. A method as defined in claim 1 which further includes deriving a reject reference signal from said article-absent signal, and comparing the measurement signal to said reject reference signal to detect a non-acceptable article.

3. Apparatus for measuring the thickness of an article formed of dielectric material, comprising
   a. an inspection station including means for establishing a high frequency field at the inspection station which will extend through at least a portion of an article present at the inspection station,
   b. means for indexing an article into and out of said inspection station,
   c. means for detecting the high frequency field established at the inspection station and providing an output related in amplitude to the amplitude of the high frequency detected,
   d. means responsive to the position of said indexing means for receiving said detection output only when an article is not at said inspection station and providing an absent signal output related in amplitude to the received detection output, and
   e. means for maintaining said absent signal output fixed at the level occurring just before an article is indexed into said inspection station, and means for comparing a detection output when an article is at said inspection station with said fixed absent signal output to derive a thickness signal proportional to the thickness of that portion of the article through which the high frequency field extends.

4. Apparatus as defined in claim 3 which further includes
   a. means for deriving a reject reference signal from said absent signal output which is proportional to an acceptable thickness, and
   b. means for comparing said thickness signal with said reject reference signal to determine the acceptability of an article.

5. Apparatus as defined in claim 4 which further includes
   a. means for relatively moving said article and said high frequency field to obtain a thickness signal for different portions of said article, and in which b. said reject reference and thickness signals comparing means includes means providing an output when an acceptable thickness is detected.

6. Apparatus as defined in claim 5 which further includes counter means responsive to the detection of an acceptable thickness for indicating the inspection of an article.

7. Apparatus as defined in claim 5 in which said reject reference and thickness signals comparing means further includes means for monitoring said thickness signal to determine whether an article is actually being inspected and for providing a reject signal when an acceptable thickness is not detected during the time an article is being inspected.

8. Apparatus for measuring the wall thickness of glass containers, comprising
   a. means for successively moving a series of containers into an inspection station,
   b. means at said station for rotating the containers about their vertical axes,
   c. at least one inspection head at said inspection station including means for establishing an electromagnetic field extending through a wall of a container and probe means for sensing the electromagnetic field,
   d. means responsive to said probe for providing a detection output which varies in amplitude in response to a variance in the electromagnetic field sensed by said probe means,
   e. means for sensing said detection output only when a container is not present at said inspection station and providing a reference output proportional to said detection output, and
   f. means for maintaining said reference output fixed while a container is at the station at the level occurring just before a container is moved into the station, and means for receiving said detection output after a container is moved into said station and comparing said detection output to said fixed reference output to derive a signal proportional to the thickness of the wall of said container in said electromagnetic field, thereby automatically compensating for component and ambient variations affecting said detection 9. Apparatus as defined in claim 8 which further includes
   a. means responsive to said reference output for providing a reject level signal, and
   b. means for comparing said thickness signal and said reject level signal to indicate acceptable containers.

10. Apparatus for measuring the thickness of an article formed of dielectric material, comprising
    a. means for moving an article into and out of an inspection station,
    b. means for establishing a high frequency field at the inspection station which will extend through a portion of an article present at the inspection station,
    c. means for detecting the strength of the field at the inspection station and providing an output which is a measure of the strength of the field,
    d. means responsive to the action of said article moving means for receiving said field detection output only when an article is not at the inspection station and providing an article-absent output which is a measure of the strength of the field when an article is not present at the inspection station, and
    e. means for maintaining said article-absent output fixed while an article is at the station at the level occurring just before an article is moved into the station, and means for comparing a detection output when an article is at said inspection station with said fixed article-absent output to provide a signal which is a measure of the thickness of that portion of the article through which said field extends.

11. Apparatus as defined in claim 10 in which said article-absent output means and said comparing means comprises
    a. a summer circuit,
    b. an integrating circuit, and
    c. switching means operable to close when an article is not at the inspection station, said switching means connecting the output of said summer circuit to the input of said integrating circuit,
    d. said summer circuit having a first input means for receiving said detection output and a second input means for receiving an output from said integrating circuit.

12. Apparatus as defined in claim 11 in which said integrating circuit provides an output which changes at a rate determined by the input received, and which provides a fixed output when the input is zero.

13. Apparatus as defined in claim 11 which further includes
    a. means for deriving a reject reference signal from the output of said integrating circuit, and
    b. means for comparing the output from said summer circuit with said reject reference signal to provide a reject signal when the thickness of the article is below a minimum acceptable thickness set by the magnitude of said reject reference signal.

14. Apparatus for measuring the thickness of an article formed of dielectric material, comprising
    a. means for moving an article into and out of an inspection station;
    b. means for establishing a high frequency field at the inspection station which will extend through a portion of an article present at the inspection station;
    c. means for detecting the strength of the field at the inspection station and providing an output which is a measure of the strength of the field;
    d. means responsive to the action of said article moving means for receiving said field detection output and providing an article-absent output which is a measure of the strength of the field when an article is not present at the inspection station; and
    e. means for comparing a detection output when an article is at said inspection station with said article-absent output to provide a signal which is a measure of the thickness of that portion of the article through which said field extends;
    f. said article-absent output means and said comparing means comprising at summer circuit, an integrating circuit, and switching means operable to close when an article is not at the inspection station, said switching means connecting the output of said summer circuit to the input of said integrating circuit, said summer circuit having a first input means for receiving said detection output and a second input means for receiving an output from said integrating circuit, the output of said integrating circuit being connected as a negative feedback to the input of said summer circuit with respect to the detection output being received by said summer circuit, thereby tending to drive the output of said summer circuit toward zero when said switching means is closed.

15. Apparatus for measuring the thickness of an article formed of dielectric material, comprising
   a. means for moving an article into and out of an inspection station;
   b. means for establishing a high frequency field at the inspection station which will extend through a portion of an article present at the inspection station;
   c. means for detecting the strength of the field at the inspection station and providing an output which is a measure of the strength of the field;
   d. means responsive to the action of said article moving means for receiving said field detection output and providing an article-absent output which is a measure of the strength of the field when an article is not present at the inspection station;
   e. means for comparing a detection output when an article is at said inspection station with said article-absent output to provide a signal which is a measure of the thickness of that portion or the article through which said field extends;
   f. said article-absent output means and said comparing means comprising a summer circuit, an integrating circuit, and switching means operable to close when an article is not at the inspection station, said switching means connecting the output of said summer circuit to the input of said integrating circuit, said summer circuit having a first input means for receiving said detection output and a second input means for receiving an output from said integrating circuit;
   g. means for deriving a reject reference signal from the output of said integrating circuit; and
   h. means for comparing the output from said summer circuit with said reject reference signal to provide a reject signal when the thickness of the article is below a minimum acceptable thickness set by the magnitude of said reject reference signal;
   i. said reject reference signal and summer output comparing means including a first comparator circuit having a first input means for receiving said summer output, a second input means for receiving said reject reference signal, and output means for providing an output when the summer output exceeds the reject reference signal, and further including a second comparator circuit having input means for receiving said summer output and said first comparator output, and output means providing a reject signal output when said summer output indicates a measurable thickness of an article and the output of said first comparator circuit indicates a below minimum thickness of said article.

16. Apparatus as defined in claim 15 which further includes
   a. means for relatively moving said article and said field at said inspection station to measure the thickness of different portions of said article, and
   b. counter means responsive to the output of said first comparator circuit for counting the articles inspected in response to an indication of acceptable thickness of any portion of said article.

* * * * *